(12) United States Patent
Hauge et al.

(10) Patent No.: US 8,124,503 B2
(45) Date of Patent: Feb. 28, 2012

(54) CARBON NANOTUBE DIAMETER SELECTION BY PRETREATMENT OF METAL CATALYSTS ON SURFACES

(75) Inventors: Robert H. Hauge, Houston, TX (US); Ya-Qiong Xu, Houston, TX (US); Hongwei Shan, Houston, TX (US); Nolan Walker Nicholas, South Charleston, WV (US); Myung Jong Kim, Houston, TX (US); Howard K. Schmidt, Cypress, TX (US); W. Carter Kittrell, Houston, TX (US)

(73) Assignee: William Marsh Rice University, Houston, TX (US)

( * ) Notice: Subject to any disclaimer, the term of this patent is extended or adjusted under 35 U.S.C. 154(b) by 306 days.

(21) Appl. No.: 12/281,611

(22) PCT Filed: Mar. 5, 2007

(86) PCT No.: PCT/US2007/063298
§ 371 (c)(1),
(2), (4) Date: Jun. 2, 2009

(87) PCT Pub. No.: WO2008/054839
PCT Pub. Date: May 8, 2008

(65) Prior Publication Data
US 2009/0294753 A1 Dec. 3, 2009

Related U.S. Application Data

(60) Provisional application No. 60/778,739, filed on Mar. 3, 2006.

(51) Int. Cl.
*H01L 21/20* (2006.01)
(52) U.S. Cl. ........ 438/478; 438/492; 438/496; 438/795; 257/E21.09
(58) Field of Classification Search .................. 438/478, 438/492, 496, 795; 977/750, 844, 890, 891; 257/E21.09
See application file for complete search history.

(56) References Cited

U.S. PATENT DOCUMENTS

| | | | | |
|---|---|---|---|---|
| 6,333,016 | B1 * | 12/2001 | Resasco et al. | 423/447.3 |
| 7,282,191 | B1 * | 10/2007 | Choi et al. | 423/447.3 |
| 2003/0203419 | A1 * | 10/2003 | Ren et al. | 428/34.3 |
| 2004/0005723 | A1 * | 1/2004 | Empedocles et al. | 438/1 |
| 2004/0150311 | A1 * | 8/2004 | Jin | 313/309 |
| 2004/0192151 | A1 * | 9/2004 | Tsukamoto et al. | 445/50 |
| 2005/0074392 | A1 * | 4/2005 | Yang et al. | 423/447.3 |
| 2005/0112051 | A1 * | 5/2005 | Liu et al. | 423/447.1 |
| 2005/0287689 | A1 * | 12/2005 | Iwaki et al. | 438/22 |
| 2006/0024227 | A1 * | 2/2006 | Maruyama et al. | 423/447.3 |

FOREIGN PATENT DOCUMENTS

| | | |
|---|---|---|
| JP | 2005116618 A | 4/2005 |
| WO | 00/26138 | 5/2000 |
| WO | 2003081687 A2 | 10/2003 |
| WO | 2003082733 A2 | 10/2003 |
| WO | 2004000728 A1 | 12/2003 |
| WO | 2005009900 A2 | 2/2005 |

OTHER PUBLICATIONS

Li, et al., "Growth of single-walled carbon nanotubes from discrete catalytic nanoparticles of various sizes", J.Phys. Chem., vol. 105, (2001), pp. 11424-11431.
Xu, et al., "Vertical array growth of small diameter single-walled carbon nanotubes", J. Am. Chem. Soc., vol. 128, (2006), pp. 6560-6561.
International Search Report and Written Opinion, PCT/US07/063298, Mar. 9, 2009, 15 pages.
Cherukuri, et al., "Near-Infrared Fluorescence Microscopy of Single-Walled Carbon Nanotubes in Phagocytic Cells", J. Am. Chem. Soc., 126 (2004), pp. 15638-15639.
Strano, et al., "The Role of Surfactant Adsorption during Ultrasonication in the Dispersion of Single-Walled Carbon Nanotubes", J. Nanosci. Nanotech., 3 (2003), pp. 81-86.
O'Connell, et al., "Band Gap Fluorescence from Individual Single-Walled Carbon Nanotubes", Science, 297 (2002), pp. 593-596.
Moore, et al., "Individually Suspended Single-Walled Carbon Nanotubes in Various Surfactants", Nano. Lett., 3 (2003), pp. 1379-1382.
O'Connell, et al., "Reversible water-solubilization of single-walled carbon nanotubes by polymer wrapping", Chem. Phys. Lett., 342 (2001), pp. 265-271.
Jiao, et al., "Fabrication and Characterization of Carbon Nanotube Field Emitters", Mat. Res. Soc. Symp. Proc., 706 (2002), pp. Z5.3.1-Z5.3.6.
Li, et al., "Electron field emission from single-walled carbon nanotube nonwoven", Chin. Phys.,15 (2006), pp. 422-427.
Wuerker, et al., "Pulsed energy storage antennas for ionospheric modification", Annales Geophysicae, 23 (2005), pp. 101-107.
Krupke, et al., "Separation of Metallic from Semiconducting Single-Walled Carbon Nanotubes", Science, 301 (2003), pp. 344-347.
Chan, et al., "Influence of AC electric field on dispersion of carbon nanotubes in liquids", J. Dispersion Sci. Tech., 27 (2006), pp. 935-940.
Grimes, et al., "The 500 MHz to 5.50 GHz complex permittivity spectra of single-wall carbon nanotube-loaded polymer composites", Chem. Phys. Lett., 319 (2000), pp. 460-464.
Liu, et al., "Fullerene Pipes", Science, 280 (1998), pp. 1253-1256.
Zhang, et al., "Radio-frequency characterization for the single-walled carbon nanotubes", Appl. Phys. Lett., 88 (2006), pp. 163109-1-163109-3.
Han, et al., "The conductivity of single walled nanotube films in terahertz region", Phys. Lett. A, 310 (2003), pp. 457-459.
Wadhawan, et al., "Nanoparticle-assisted microwave absorption by single-wall carbon nanotubes", Appl. Phys. Lett., 83 (2003), pp. 2683-2685.

(Continued)

*Primary Examiner* — Angel Roman
(74) *Attorney, Agent, or Firm* — Winstead PC

(57) ABSTRACT

A new and useful nanotube growth substrate conditioning processes is herein disclosed that allows the growth of vertical arrays of carbon nanotubes where the average diameter of the nanotubes can be selected and/or controlled as compared to the prior art.

22 Claims, No Drawings

OTHER PUBLICATIONS

Highstrete, et al., "Microwave dissipation in arrays of single-wall carbon nanotubes", Appl. Phys. Lett., 89 (2006), pp. 173105-1-173105-3.

Kim, et al., "Electrical properties of single-wall carbon nanotube and epoxy composites", J. Appl. Phys., 94 (2003), pp. 6724-6728.

Imholt, et al., "Nanotubes in Microwave Fields: Light Emission, Intense Heat, Outgassing, and Reconstruction", Chem. Mater., 15 (2003), pp. 3969-3970.

Vaillancourt, et al., "High-speed thin-film transistor on flexible substrate fabricated at room temperature", Electronics Lett., 42 (2006).

Kempa, et al., "Dielectric media based on isolated metallic nanostructures", J. Appl. Phys., 98 (2005), pp. 034310-1-034310-4.

Shi, et al., "Investigation on dielectric properties of the polyetherketone nanocomposite with lead titanate ultrafines", Can. J. Phys., 79 (2001), pp. 847-855.

Trakhtenberg, et al., "New nano-composite metal-polymer materials: dielectric behaviour", J. Non-Crystalline Solids, 305 (2002), pp. 190-196.

Dang, et al., "Dielectric properties and morphologies of composites filled with whisker and nanosized zinc oxide", Mater. Res. Bull., 38 (2003), pp. 499-507.

Che, et al., "Microwave absorption enhancement and complex permittivity and permeability of Fe encapsulated within carbon nanotubes," Adv. Mater., 16 (2004), p. 401.

Valentini, et al., "AC conductivity of conjugated polymer onto self-assembled aligned carbon nanotubes", J. Diamond and Rel. Mater., 13 (2004), pp. 250-255.

Potschke, et al., "Dielectric spectroscopy on melt processed polycarbonate—multiwalled carbon nanotube composites", Polymer, 44 (2003), pp. 5023-5030.

Watts, et al., "The complex permittivity of multi-walled carbon nanotube-polystyrene composite films in X-band", Chem. Phys. Lett., 378 (2003), pp. 609-614.

Lagarkov, et al., "Electromagnetic Properties of Composites Containing Elongated Conducting Inclusions", Phys. Rev. B, 53 (1996), pp. 6318-6336.

Kempa, "Dielectric Function of Media Based on Conductive Particles", Phys. Rev. B, 74(2006), pp. 033411-1-033411-3.

Hill, et al., "Debye and Non-Debye Relaxation", J. Phys. C, 18 (1985), pp. 3829-3836.

Li, et al., "Single-walled carbon nanotubes as ultrahigh frequency nanomechanical resonators", Physical Rev. B, 68 (2003), pp. 073405-1-073405-3.

Kim, et al., "Electrical conductivity and electromagnetic interference shielding of multiwalled carbon nanotube composites containing Fe catalyst", Appl. Phys. Lett., 84 (2004), pp. 589-591.

Roberts, et al., "Electromagnetic wave properties of polymer blends of single wall carbon nanotubes using a resonant microwave cavity as a probe", J. Appl. Phys., 95 (2004), pp. 4352-4356.

Wu, et al., "High microwave permittivity of multiwalled carbon nanotube composites", Appl. Phys. Lett., 84 (2004), pp. 4956-4958.

Dragoman, et al., "Experimental determination of microwave attenuation and electrical permittivity of double-walled carbon nanotubes", Appl. Phys. Lett., 88 (2006), pp. 153108-1-153108-3.

Kim, et al., "Microwave response of individual multiwall carbon nanotubes", Phys. Rev. B, 70 (2004), pp. 153402-1-153402-3.

Zhang, et al., "Alternating current dielectrophoresis of carbon nanotubes", J. Appl. Phys., 98 (2005), pp. 056103-1-056103-3.

Zhang, et al., "Complex Permittivity and Permeability Spectra of Different Kinds of Carbon Nanotubes", Acta Physico-Chimica Sinica, 22 (2006), pp. 296-300.

Li, et al., "Electromagnetic Interference (EMI) Shielding of Single-Walled Carbon Nanotube Epoxy Composites", Nano Lett., 6 (2006), pp. 1141-1145.

Hao, et al., "Infrared and optical properties of carbon nanotube dipole antennas", IEEE Trans. Nanotechnology, 5 (2006), pp. 766-775.

Ye, et al., "Microwave absorption by an array of carbon nanotubes: A phenomenological model", Physical Rev. B, 74 (2006), 74, pp. 075425-1-075425-5.

Bohren, "How can a particle absorb more than the light incident on it?", Am. J. Phys., 51 (1983), p. 323-327.

Hata, et al., "Water-Assisted Highly Efficient Synthesis of Impurity-Free Single-Walled Carbon Nanotubes", Science, 306 (2004), pp. 1362-1364.

Eres, et al., "Molecular Beam-Controlled Nucleation and Growth of Vertically Aligned Single-Wall Carbon Nanotube Arrays", J. Phys. Chem. B, 109 (2005), p. 16684-16694.

Zhang, et al., "Ultra-high-yield growth of vertical single-walled carbon nanotubes: Hidden roles of hydrogen and oxygen", Proc. Nat. Acad. Sci., 102 (2005), pp. 16141-16145.

Iwasaki, et al., "Direct Evidence for Root Growth of Vertically Aligned Single-Walled Carbon Nanotubes by Microwave Plasma Chemical Vapor Deposition", J. Phys. Chem. B, 109 (2005), pp. 19556-19559.

Zhong, et al., "Low Temperature Synthesis of Extremely Dense and Vertically Aligned Single-Walled Carbon Nanotubes", Jpn. J. Appl. Phys., 44 (2005), pp. 1558-1561.

Maruyama, et al., "Growth process of vertically aligned single-walled carbon nanotubes", Chem. Phys. Lett., 403 (2005), pp. 320-323.

Talapatra, et al., "Direct growth of aligned carbon nanotubes on bulk metals", Nature Nanotechnology, 1 (2006), pp. 112-116.

Huang, et al., "Growth of Millimeter-Long and Horizontally Aligned Single-Walled Carbon Nanotubes on Flat Substrates", J. Am. Chem. Soc., 125 (2003), pp. 5636-5637.

Murakami, et al., "Growth of vertically aligned single-walled carbon nanotube films on quartz substrates and their optical anisotropy", Chem. Phys. Lett., 385 (2004), pp. 298-303.

* cited by examiner

CARBON NANOTUBE DIAMETER SELECTION BY PRETREATMENT OF METAL CATALYSTS ON SURFACES

GRANT INFORMATION

This invention was made with government support under Grant Number DE-FC36-05GO15073, awarded by the U.S. Department of Energy; and Air Force Office of Scientific Research Grant Number F33615-01-D-5802, awarded by the U.S. Department of Defense. The Government has certain rights in the invention.

BACKGROUND OF THE INVENTION

1. Field of the Invention

The present invention generally relates to enhanced methods of diameter selection for nanotube growth by pretreatment of the at least one catalyst particle from which the at least one nanotube grows.

2. Background

Carbon nanotubes are nanoscale high-aspect-ratio cylinders consisting of hexagonal rings of carbon atoms that may assume either a semiconducting electronic state or a conducting electronic state. Semiconducting carbon nanotubes have been used to form hybrid devices, such as hybrid FET's. In particular, FET's have been fabricated using a single semiconducting carbon nanotube as a channel region. Typically, ohmic contacts at opposite ends of the semiconducting carbon nanotube extending between a source electrode and a drain electrode situated on the surface of a substrate.

Accordingly, much attention has been given to the use nanomaterials in semiconductor devices.

Many methods exist for forming and/or creating nanotubes and nanotube arrays. A conventional method of forming carbon nanotubes utilizes a chemical vapor deposition (CVD) process. Specifically, the CVD process directs a flow of a carbonaceous reactant to a catalyst material located on the substrate, where the reactant is catalyzed to synthesize carbon nanotubes. The carbon nanotubes are capable of being lengthened by insertion of activated carbon atoms at the interface with the catalyst material. Typically, the carbon nanotubes are then collected for an end use or further processing.

In defining the size and conformation of single-wall carbon nanotubes, the system of nomenclature described by Dresselhaus et al., *Science of Fullerenes and Carbon Nanotubes*, 1996, San Diego: Academic Press, Ch. 19, is commonly used. Single-wall tubular fullerenes are distinguished from each other by a double index (n, m), where n and m are integers that describe how to cut a single strip of hexagonal graphite such that its edges join seamlessly when the strip is wrapped onto the surface of a cylinder. When n=m, the resultant tube is said to be of the "arm-chair" or (n, n) type, since when the tube is cut perpendicularly to the tube axis, only the sides of the hexagons are exposed and their pattern around the periphery of the tube edge resembles the arm and seat of an arm chair repeated n times. When m=0, the resultant tube is said to be of the "zig zag" or (n,0) type, since when the tube is cut perpendicular to the tube axis, the edge is a zig zag pattern. Where n≠m and m≠0, the resulting tube has chirality. The electronic properties are dependent on the conformation, for example, arm-chair tubes are metallic and have extremely high electrical conductivity. Other tube types are metallic, semi-metals or semi-conductors, depending on their conformation. Regardless of tube type, all single-wall nanotubes have extremely high thermal conductivity and tensile strength.

Single-wall carbon nanotubes have been made in a DC arc discharge apparatus by simultaneously evaporating carbon and a small percentage of Group VIIIb transition metal from the anode of the arc discharge apparatus. These techniques allow production of only a low yield of carbon nanotubes, and the population of carbon nanotubes exhibits significant variations in structure and size.

Another method of producing single-wall carbon nanotubes involves laser vaporization of a graphite substrate doped with transition metal atoms (such as nickel, cobalt, or a mixture thereof) to produce single-wall carbon nanotubes. The single-wall carbon nanotubes produced by this method tend to be formed in clusters, termed "ropes," of about 10 to about 1000 single-wall carbon nanotubes in parallel alignment, held by van der Waals forces in a closely packed triangular lattice. Nanotubes produced by this method vary in structure, although one structure tends to predominate. Although the laser vaporization process produces an improved yield of single-wall carbon nanotubes, the product is still heterogeneous, and the nanotubes tend to be too tangled for many potential uses of these materials. In addition, the laser vaporization of carbon is a high energy process.

Another way to synthesize carbon nanotubes is by catalytic decomposition of a carbon-containing gas by nanometer-scale metal particles supported on a substrate. The carbon feedstock molecules decompose on the particle surface, and the resulting carbon atoms then precipitate as part of a nanotube from one side of the particle. This procedure typically produces imperfect multi-walled carbon nanotubes.

Another method for production of single-wall carbon nanotubes involves the disproportionation of CO to form single-wall carbon nanotubes and $CO_2$ on alumina-supported transition metal particles comprising Mo, Fe, Ni, Co, or mixtures thereof. This method uses inexpensive feedstocks in a moderate temperature process. However, the yield is limited due to rapid surrounding of the catalyst particles by a dense tangle of single-wall carbon nanotubes, which acts as a barrier to diffusion of the feedstock gas to the catalyst particle surface, limiting further nanotube growth.

Control of ferrocene/benzene partial pressures and addition of thiophene as a catalyst promoter in an all gas phase process can produce single-wall carbon nanotubes. However, this method suffers from simultaneous production of multi-wall carbon nanotubes, amorphous carbon, and other products of hydrocarbon pyrolysis under the high temperature conditions necessary to produce high quality single-wall carbon nanotubes.

A method for producing single-wall carbon nanotubes has been reported that uses high pressure CO as the carbon feedstock and a gaseous transition metal catalyst precursor as the catalyst. ("Gas Phase Nucleation and Growth of Single-Wall Carbon Nanotubes from High Pressure Carbon Monoxide," International Pat. Publ. WO 00/26138, published May 11, 2000, incorporated by reference herein in its entirety). This method possesses many advantages over other earlier methods. For example, the method can be done continuously, and it has the potential for scale-up to produce commercial quantities of single-wall carbon nanotubes. Another significant advantage of this method is its effectiveness in making single-wall carbon nanotubes without simultaneously making multi-wall nanotubes. Furthermore, the method produces single-wall carbon nanotubes in high purity, such that less than about 10 wt % of the carbon in the solid product is attributable to other carbon-containing species, which includes both graphitic and amorphous carbon.

As grown nanotubes, particularly carbon nanotubes, typically range from a few to tens of nm in diameter, and are as long as a few nanometers in length. Because of its one-dimensional electronic properties due to this shape anisotropy, the carbon nanotube characteristically has a maximum current density allowing the flowing of current without disconnection of 1,000,000 A per square centimeter, which is 100 times or more as high as that of a copper interconnect. Further, with respect to heat conduction, the carbon nanotube is ten times as high in conductivity as copper.

In terms of electric resistance, it has been reported that transportation without scattering due to impurities or lattice vibration (phonon) can be realized with respect to electrons flowing through the carbon nanotube. It is known that resistance per carbon nanotube, in various instances, is approximately 6.45 k$\Omega$. However, other resistances are contemplated in various embodiments of the present invention.

Further desirable attributes of a carbon nanotube electrode material include such factors as high surface area for the accumulation of charge at the electrode/electrolyte interface, good intra- and interparticle conductivity in the porous matrices, good electrolyte accessibility to the intrapore surface area, chemical stability and high electrical conductivity. Commonly used carbonaceous material used for the construction of carbon nanotubes include such materials as activated carbon, carbon black, carbon fiber cloth, highly oriented pyrolytic graphite, graphite powder, graphite cloth, glassy carbon, carbon aerogel, and/or the like.

Typically, nanotubes can be classified into horizontal architectures and vertical architectures. Horizontal nanotubes exhibit carrier flow from source to drain in a direction parallel to the horizontal plane of the substrate on which they are formed. Vertical nanotubes exhibit carrier flow from source to drain in a direction vertical to the horizontal plane of the substrate on which they are formed.

It is commonly understood that vertical nanotubes provide and/or allow for a shorter switching time because channel length for vertical nanotubes does not depend on the smallest feature size resolvable by, for example, lithographic equipment and methods. Therefore, vertical nanotubes possess a higher power handling capacity than typical horizontal nanotubes.

Previous studies have shown that carpets (forests) of single-walled carbon nanotubes can be readily grown at atmospheric pressures with controlled mixtures containing various hydrocarbons and also in the presence of hydrogen and various hydrocarbons at sub-atmospheric pressures with activation of gas mixtures via plasma formation by microwave or RF discharges. In all cases, however, production of small diameter SWNT was not optimized with the use of substrate heating in the presence of an activated gas. Previous studies have also shown that hot filament activation of gas mixtures of hydrogen and hydrocarbons activates the growth of multi-walled carbon nanotubes in the presence of metal catalyst particles. Hata, et al., *Science* 2004, 306, 1362; Gyula, et al., *J. Phys. Chem. B* 2005, 109, 16684; Zhang, et al., *PNAS* 2005, 102, 16141; Iwasaki, et al., *J. Phys. Chem. B* 2005, 109, 19556; Zhong, et al, J. Appl. Phys, 2005, 44, 1558; Maruyama, et al., I 12005, 403, 320; Huang et al., *J. Am Chem.* Soc. 2003, 125, 5636.

Recent studies have shown that small diameter carbon nanotubes (1-2 nm in diameter) can be grown from metal catalyst particles deposited on surfaces. (1) This is accomplished by causing nanotube nucleation to occur at temperatures where catalyst particles are immobile. This permits the nucleation of nanotubes whose diameters are as small as the original metal catalyst particles.

However, in the prior art, a process requiring and/or desiring a nanotube of diameter less than 1 nm would use a catalyst particle, such as a metal catalyst particle, with a diameter less than 1 nm. In this manner, a design characteristic for the grown nanotube is the diameter and/or size of the catalyst particle and process and/or product can be varied by varying catalyst particle size. In fact, in the prior art, the diameter of the catalyst particles is a limiting factor on the growth of a nanotube.

Accordingly, the art field is in search of improved methods of manufacturing semiconductor devices out of nanotube material, such as carbon nanotubes, especially improved methods of growth and/or production of size controlled and/or selected arrays and/or forests of nanotubes.

SUMMARY OF THE INVENTION

These and other features and advantages of the invention will be apparent to those skilled in the art from the following detailed description of various embodiments, taken together with the accompanying figures and claims, in which:

Various embodiments of the present invention comprise processes for fabrication and, more particularly, to methods of producing at least one vertical nanotube and/or an array of such nanotubes. In an embodiment, the array of nanotubes is a vertical array. Such methods of production provide for at least one of decreased nanotube diameter, increased process control, and/or the like.

More particularly, various embodiments of the present invention comprise methods for the diameter controlled growth of at least one nanotube. In an embodiment, at least one catalyst particle placed on a nanotube growth substrate is treated to at least partially control the diameter of the nanotube. In an embodiment, the diameter of the at least one catalyst particle is increased by treatment. In an alternate embodiment, the diameter of the at least one catalysts particle is decreased by treatment.

Various method of treatment are available with embodiments of the present invention. In general, any method of modifying the diameter of the at least one catalyst particle can be used. In an embodiment, the method of modifying is chosen from the group comprising of chemical treatment, temperature treatment, ion bombardment treatment, and/or the like.

Once the at least one catalyst particle is modified, various embodiments of the present invention are capable of being combined with any nanotube growth method utilizing a catalyst particle. Accordingly, various embodiments of the present invention are capable of use as an early stage growth process wherein the foundation of at least one nanotube is fabricated.

More particularly, generally, embodiments of the present invention comprise a method for producing at least one nanotube comprising then steps of:

1. Placing at least one catalyst particle on a suitable nanotube growth substrate;
2. Modifying the at least one catalyst particle;
3. Growing the at least one nanotube.

In an alternate embodiment, an array of nanotubes is grown.

In various embodiments, the at least one nanotube grows at about 2.5 μm per minute.

The nanotubes produced according to embodiments of the present invention can be used in any of a number of semiconductor devices, as is known in the art.

Further embodiments disclose a method of reducing the heat generated from an integrated circuit comprising the step of replacing the integrated circuit's silicon with a carbon nanotube formation as herein disclosed.

In various further embodiments, a semiconductor device is fabricated from the at least one nanotube. In further embodiments, an array of devices if fabricated.

DETAILED DESCRIPTION OF THE INVENTION

The particulars shown herein are by way of example and for purposes of illustrative discussion of the various embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description makes apparent to those skilled in the art how the several forms of the invention may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary, $3^{rd}$ Edition.

As used herein, the term "attached," or any conjugation thereof describes and refers the at least partial connection of two items.

As used herein, the term "dielectric" means and refers to a substance in which an electric field may be maintained with zero or near-zero power dissipation, i.e., the electrical conductivity is zero or near zero. In various embodiments, a dielectric material is an electrical insulator.

As used herein, a "fluid" is a continuous, amorphous substance whose molecules move freely past one another and that has the tendency to assume the shape of its container, for example, a liquid or a gas.

As used herein, the term "integral" means and refers to a non-jointed body.

As used herein, the term "nanotube" means and refers to cylinder-like ring structures of atoms. In an embodiment, the nanotubes are carbon nanotubes. However, other nanotubes may be used, such as silicon.

As used herein, the term "nanotube growth substrate" or "growth substrate" means and refers to a support for catalytic particles from which at least one nanotube grows. Commonly, the substrate itself is capable of affecting the growth of the nanotube because of possible interaction between the catalyst particles and the substrate. In general, any substrate is capable of use with varying embodiments of the present invention so long as at least one nanotube grows therefrom. In an embodiment, silicon is used. In another embodiment, a metal oxide, such as aluminum oxide is used. However, one skilled in the art is capable of determining suitable nanotube growth substrates.

As used herein, the term "optical anisotropy" means and refers to a the property of being optically directionally dependent. Stated another way, it is the behavior of a medium, or of a single molecule, whose effect on electromagnetic radiation depends on the direction of propagation of the radiation.

As used herein, the term "reaction chamber" means and refers to a gas activation zone. The reaction chamber is capable of being defined by walls or other boundaries, but also is capable of comprising a zone or other unrestricted area.

As used herein, the term "semiconductor device" means and refers at least one device used in or with a formation of transistors, capacitors, interconnections, batteries, supercapacitors, and/or the like, particularly various memory devices, such as, but not limited to DRAM, SRAM, SCRAM, EDRAM, VDRAM, NVSRAM, NVDRAM, DPSRAM, PSDRAM, transistor/capacitor cell devices, vias or interconnects, and vertical stacks of logic gates. However, other devices utilizing transistors, capacitors, interconnections, and/or the like are to be included within this definition.

As used herein, the term "trace" is not intended to be limiting to any particular geometry or fabrication technique and instead is intended to broadly cover an electrically conductive path.

Other than in the operating examples, or where otherwise indicated, all numbers expressing quantities of ingredients or reaction conditions used herein are to be understood as modified in all instances by the term "about".

References herein to terms such as "vertical" and "horizontal" are made by way of example to establish a frame of reference. The term "horizontal" as used herein is defined as a plane parallel to the conventional plane or surface of substrate. The term "vertical" refers to a direction perpendicular to the horizontal, as defined above. Terms, such as "on", "above", "below", "side" (as in "sidewall"), "higher", "lower", "over", "beneath" and "under", are defined with respect to the horizontal plane.

As such, various embodiments of the present invention comprise novel processes for growing and/or producing enhanced nanotube carpets comprising vertical nanotubes with a controlled diameter as compared to the prior art. In an embodiment, the nanotube carpets grown according to embodiments of the present invention comprise nanotubes with diameters less than about 5 nm. In an alternate embodiment, the nanotube carpets grown according to embodiments of the present invention comprise nanotubes with diameters less than about 4 nm. In an alternate embodiment, the nanotube carpets grown according to embodiments of the present invention comprise nanotubes with diameters less than about 3 nm. In an alternate embodiment, the nanotube carpets grown according to embodiments of the present invention comprise nanotubes with diameters less than about 2 nm. In an alternate embodiment, the nanotube carpets grown according to embodiments of the present invention comprise nanotubes with diameters less than about 1 nm. In general, various embodiments of the present invention are capable of growing any size nanotubes, as embodiments of the present invention allow and are capable of controlling a nanotube's diameter.

Various embodiments of the present invention comprise processes for methods of fabrication and, more particularly, to methods of producing at least one vertical nanotube and/or an array of such vertical nanotubes. Such methods of production provide for at least one of decreased nanotube diameter, increased nanotube purity, process control, and/or the like.

Further, various embodiments of the present invention are capable of being combined with conventional nanotube growth methods where the an embodiment of the present invention is capable of being used to modify a nanotubes diameter followed by growing of the nanotube under suitable growth environments. Accordingly, various embodiments of the present invention are capable of use as an early stage growth process wherein the foundation of at least one nanotube is fabricated.

More particularly, generally, embodiments of the present invention comprise a method for producing at least one nanotube comprising then steps of:

1. Placing at least one catalyst particle on a suitable nanotube growth substrate;
2. Modifying the at least one catalyst particle;
3. Growing the at least one nanotube.

In an alternate embodiment, an array of nanotubes is grown.

In an embodiment, the step of placing a catalyst particle on a suitable nanotube growth substrate is performed by any suitable method, such as physically, deposition, injection, pouring, and/or the like.

Various further embodiments of the present invention comprise a step of patterning at least one catalyst particle on a suitable nanotube growth substrate. In this manner, patterned islands and/or carpets of nanotubes can be grown. In an embodiment, the catalyst particles are patterned for eventual placement on a semiconductor device.

In an embodiment, the step of modifying the at least one catalyst particle is modifying the diameter of the catalyst particle. In an alternate embodiment, the step of modifying the at least one catalyst particle is modifying the mass of the catalyst particle. In an alternate embodiment, the step of modifying the at least one catalyst particle is modifying the height of the catalyst particle off the substrate. In an alternate embodiment, the step of modifying the at least one catalyst particle is modifying the number of reaction sites of the catalyst particle. In an alternate embodiment, the step of modifying the at least one catalyst particle is modifying the charge of the catalyst particle. In general, any modification to the catalyst particle can be made that alters, changes, and/or enhances the character of the eventually grown nanotube.

In various embodiments wherein the size of the catalyst is modified, a decrease in the diameter of the catalyst particle produces a decrease in the diameter of the eventually grown nanotube. In various embodiments wherein the size of the catalyst is modified, an increase in the diameter of the catalyst particle produces an increase in the diameter of the eventually grown nanotube.

Various methods are possible for modifying the diameter of at least one catalyst particle. In an embodiment, the diameter of the at least one catalyst particle is modified by chemically treating the at least one catalyst particle. In an alternate embodiment, the diameter of the at least one catalyst particle is modified by temperature treating the at least one catalyst particle, such as by cold or heat. In an alternate embodiment, the diameter of the at least one catalyst particle is modified by ion bombardment treatment to the at least one catalyst particle. In various other embodiments, other methods of modifying the diameter of the at least one catalyst particle are used.

In an embodiment, a method for producing at least one single walled nanotube, the method comprising the step of placing at least one catalyst particle on a nanotube growth substrate surface; modifying the at least one catalyst particle; contacting the substrate with a gas mixture comprising hydrogen and a carbon containing species in a reaction chamber; heating the substrate and the activated gas; and, activating the gas mixture, wherein at least one vertical small diameter nanotube is produced at or about the at least one catalyst particle on the nanotube growth substrate.

Alternate embodiments further comprise the step of further growing the at least one nanotube by a conventional growth process.

In various embodiments, the at least one nanotube grows at about 2.5 μm per minute.

Further embodiments disclose a method of reducing the heat generated from an integrated circuit comprising the step of replacing the integrated circuit's silicon with a carbon nanotube formation as herein disclosed.

Further embodiments disclose a method of increasing the operating speed of a semiconductor device comprising the step of replacing the integrated circuit's silicon with a carbon nanotube formation as herein disclosed.

In various further embodiments, a semiconductor device is fabricated from the at least one nanotube. In an embodiments, a semiconductor device of various embodiments of the present invention is selected from at least one of transistors, capacitors, interconnections, batteries, supercapacitors, and/or the like, particularly various memory devices, such as, but not limited to DRAM, SRAM, SCRAM, EDRAM, VDRAM, NVSRAM, NVDRAM, DPSRAM, PSDRAM, transistor/capacitor cell devices, vias or interconnects, and vertical stacks of logic gates. Further, other devices utilizing transistors, capacitors, interconnections, and/or the like are to be included within this definition. In further embodiments, an array of devices is fabricated.

In an embodiment it is desired to use a lower temperature to prevent and/or hinder nanotube aggregation. It has been experienced at increased temperatures that growing nanotubes tend to aggregate.

In an embodiment, the placement of the catalyst particle is achieved by a CVD procedure as is common in the art. In an embodiment, the CVD process is an alcohol-CVD technique as disclosed in Maruyama, et al., *Chem. Phys. Lett.* 2002, 360, 229 and Murakami et al., *Chem. Phys. Lett.* 2003, 377, 49.

In an embodiment, formation of metal catalyst particles comprises a coating process that at least partially mimics various commercial coating technologies. Embodiments of this technology permit large scale coating of metal foil (substrate) with a SWNT growth catalyst particle. The growth catalyst particle is then modified according to the present invention. The growth catalyst particle layer is typically constructed of a 10 nm thick aluminum oxide film which is over coated with about a 0.5 to about 1.0 nm thickness of iron. The iron is not a continuous layer and exists as small islands. These islands coalesce into nanometal particles of the order of 1 nm when the substrate is heated and nucleate a SWNT with a diameter set by the size of the metal island.

The growth of SWNT carpets on silicon substrates and recently on metal foils has opened up the possibilities for creation of new materials such as electrically and thermally non-isotropic neat and composite fibers, tapes, conductive films, nanopore membranes, and/or the like. Coupling that technology with the diameter controlled processes of the present invention are capable of providing enhanced fibers, tapes, conductive films, nanopore membranes, and/or the like.

As such, in an embodiment, a method of the present invention generally comprises:

placing at least one catalyst particle on a substrate surfaces by vapor deposition methods or as preformed metal clusters or as metal atoms or clusters on metal oxides such as alumina, silica and magnesia;

modifying the at least one catalyst particle by at least one of chemically treating, heat treating, ion bombardment treating; and/or the like; and, growing at least one nanotube.

As such, in an embodiment, a method of the present invention generally comprises:

placing at least one catalyst particle on a substrate surfaces by vapor deposition methods or as preformed metal clusters or as metal atoms or clusters on metal oxides such as alumina, silica and magnesia;

modifying the at least one catalyst particle by at least one of chemically treating, heat treating, ion bombardment treating; and/or the like;

contacting the substrate with a gas mixture comprising hydrogen and a carbon containing species;

activating the gas mixture; and, heating the substrate with the activated gas.

Important characteristics of nanotubes produced according to embodiments of this method are that they are at least one of ultra long, of uniform length, highly aligned to each other, capable of being a desired diameter, and/or the like. In various embodiments, the built in alignment permits ready dispersion into liquids as aligned domains and liquid phase processing into fibers, tapes, membranes and conductive thin films. Alternatively, vacuum infiltration of carpets by various polymers, ceramics and coating with metals creates SWNT tapes useful for structural, electrical and thermal applications.

In a further embodiment, methods of the present invention are used as a two stage growth procedure wherein at least partial growth of a nanotube is performed with a method comprising placing at least one catalyst particle on a substrate surfaces; modifying the at least one catalyst particle by at least one of chemically treating, heat treating, ion bombardment treating; and/or the like; contacting the substrate with a gas mixture comprising hydrogen and a carbon containing species; activating the gas mixture; and, heating the substrate with the activated gas, and further wherein a conventional growth method is conducted.

In various embodiments, nanotubes produced according to embodiments of the present invention provide semiconductor devices, wherein the devices include a nanotube, for example a carbon nanotube. Also provided are methods for fabrication of carbon nanotube semiconductor devices. The present invention need not be limited to the particular semiconductor devices illustrated in the figures nor the particular embodiments of the same. Other semiconductor devices or embodiments of the semiconductor devices illustrated in the drawings may be formed using the methods of the present invention. For example, the devices and methods provided herein may include individual carbon nanotubes or collections/arrays of carbon nanotubes.

In various embodiments, the prepared nanotube and/or array of nanotubes exhibits optical anisotropy due to the alignment of the nanotubes.

In various embodiments, the resistance of a nanotube, and/or nanotube carpet, of an embodiment of the present invention is between about 0.1 k$\Omega$ and about 10.0 k$\Omega$. In an alternate embodiment, the resistance of a nanotube of an embodiment of the present invention is between about 2.0 k$\Omega$ and about 8.0 k$\Omega$. In an alternate embodiment, the resistance of a nanotube of an embodiment of the present invention is between about 3.0 k$\Omega$ and about 7.0 k$\Omega$. In general, any resistance can be chosen to function with the desired process.

In various embodiments, composition of the carpets with respect to tube type is controlled, such that metallics are eliminated from the carpet. The removal of metallics may be accomplished by any method common in the art and anywhere within the process of fabricating/growing the carpet. Exemplary, non-limiting embodiments include, but are not limited to wet chemical selective functionalization, high current metallic tube burnout, and/or the like.

However, in an alternate embodiment, a SWNT can be grown onto metal films with thin insulator layers and still retain some conductivity. Talapatrala, et al., "Direct Growth of aligned carbon nanotubes on bulk metals," Department of Material Science & Engineering, Rensselaer Poytechnic Institute, 22 Oct. 2006. Further, a MWNT is capable of being grown directly onto metal substrates and have conductivity through the structure In various embodiments, synthesized carbon nanotubes randomly form in a mixture or collection of conducting and semiconducting electronic states when grown by conventional synthesis processes. In such cases, it is desirable to separate the two components. In fact, in various embodiments, the inability or failure to effectively separate nanotubes of different electronic states has hindered the maturation of carbon nanotube hybrid device structures. Any method common in the art can be used to separate the semiconducting carbon nanotubes and conducting carbon nanotubes.

Accordingly, various embodiments of the present invention disclose a method for producing at least one vertical single walled nanotube, the method comprising the step of: placing at least one catalyst particle on a nanotube growth substrate surface; modifying the catalyst particle; contacting the substrate with a gas mixture comprising hydrogen and a carbon containing species in a reaction chamber; heating the substrate and the activated gas; and, activating the gas mixture, wherein at least one vertical small diameter nanotube is produced at the at least one catalyst particle on the nanotube growth substrate.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. Further understanding of the invention may be had with reference to the following examples. As well, all changes to the claims which come within the meaning and range of equivalency of the claims are to be embraced within their scope. Further, all published documents, patents, and applications mentioned herein are hereby incorporated by reference, as if presented in their entirety.

EXAMPLES

Developments in the art field coupled with the novel and non-obvious additions of this disclosure illustrate enablement of the appended claims. Namely, Applicants have discovered improved methods of production of at least one diameter controlled nanotube.

It has been shown that carpets (forests) of vertically aligned single walled nanotubes of approximately uniform height can be grown onto substrates (generally alumina). See Hata et al., "Water-Assisted Highly Efficient Synthesis of Impurity-Free Single-Walled Carbon Nanotubes," *Science* 2004, 306, 1362-1364; Murakami et al., "Growth of vertically aligned single-walled carbon nanotube films on quartz substrates and their optical anisotropy," *Chemical Physics Letters* 2004, 385, 298-303; Xu et al., "Vertical Array Growth of Small Diameter Single-Walled Carbon Nanotubes," *Jam Chem Soc* 2006, 128, 6560-6561.

Growth

Typically, in order to grow selected diameter nanotubes, it is necessary to choose a catalyst particle with a particular size. If one is able to alter the average size of surface catalyst particle one can select the average diameter of single wall carbon nanotubes that are grown with the catalyst particle.

Metal catalyst particles or islands on an oxide or other refractory surfaces are used as sites to nucleate and grow carbon nanotubes. Metal islands can be formed by metal deposition onto a surface or preformed metal particles can be deposited onto a surface. In either case, the diameter of the newly grown carbon nanotubes will reflect their respective sizes.

As described herein, the metal size may be modified by chemical means, surface ion bombardment, thermal annealing and/or the like. This alters the size of the metal island or particle and thus the size of the resulting carbon nanotubes that are grown.

Chemical Modification

Chemical modification can produce smaller particles and islands with controlled chemical reduction of the catalyst particle. An example is the slow reaction of a halogen acid to produce the metal halide which is removed as a soluble or volatile product. This provides a means for controlled reduction of the metal particle of island size.

Concerning the pretreatment of formed catalyst particles with species such as halogen acids, it should be noted that the control of this rate may be done with the catalyst particle in the oxide form (which may be reduced to metallic catalyst particle later). It has been found that for liquid solutions having an oxidized catalyst particle is highly beneficial. However an oxide is not required for all such pretreatments.

Temperature Treatment:

The heating of a substrate to a temperature sufficiently high to cause migration of the particles or islands provides a means for increasing the size of surface metal catalyst particles. This may be accomplished by inserting the substrate into a heated furnace for a short period or by flash heating the surface with a pulsed light source.\

In heat treatments to control the size of the catalyst particle, the nature of the gas that the sample is heated in can also affect the extent of particle or island growth. For instance, the growth of metal clusters in different gas environments such as hydrogen and oxygen is expected to be different. Usually a reducing environment leads to greater growth in size because the reduced form of the metal is more mobile.

In an embodiment, the process of high temperature annealing involves the rapid placement of metal decorated substrates into a preheated furnace with a gas flow of ~500 seem where the furnace is held at 500° C. The gas is typically argon, nitrogen or oxygen. The high temperature annealing time can be varied from a few seconds to hours. The annealing time and furnace temperature strongly affect the extent of metal cluster growth on the substrate. The conditioned substrate may then be used to nucleate and grow carbon nanotubes in various growth reactors.

Surface Ion Bombardment:

Surface ion bombardment may be used to cause surface migration of metal atoms that leads to the growth of metal particle sizes. Surface migration will depend strongly on the energy of individual ions and the intensity of the ion beam. It may also depend on the chemical nature of the ion, i.e., oxygen versus argon, etc. Once appropriate studies have been carried out it is likely that controlled changes in metal particles sizes can be readily accomplished with ion bombardment of surfaces on which metal catalyst particles reside. Inductive plasmas, DC discharges, and ion mills all provide surface annealing effects due to ion bombardment.

A readily available procedure that has been shown to modify the size of metal catalyst particles on a substrate is the process of exposing the substrate to a low pressure RF discharge for one minute. This inductive plasma contains ions with energies of 10-20 eV that continually strike the surface as do much larger amounts of fast neutrals. The result is a rapid annealing of the surface. Surface annealing this manner has been shown to increase nanotube diameters by a factor of five after conditioning the surface in this manner. The rate of metal cluster growth will also depend on the nature of the gas used in the discharge. The mobility of the surface metal clusters will depend on the chemical state of the cluster, i.e., oxide, nitride, carbide or metallic, which is determined by the gas or gas mixtures that are used. The chemical nature of the discharge gas also affects the chemical state of the substrate which also affects the surface mobility of the resident metal clusters.

REFERENCES

P. Cherukuri et al., *J. Am. Chem. Soc., Near-Infrared Fluorescence Microscopy of Single-Walled Carbon Nanotubes in Phagocytic Cells*, 2004, 126, 15638-15639.

M. Strano et al., *J. Nanosci. Nanotech., The Role of Surfactant Adsorption during Ultrasonication in the Dispersion of Single-Walled Carbon Nanotubes*, 2003, 3, 81-86.

M. J. O'Connell et al., *Science, Band Gap Fluorescence from Individual Single-Walled Carbon Nanotubes*, 2002, 297, 593-596.

V. Moore et al., *Nano Lett., Individually Suspended Single-Walled Carbon Nanotubes in Various Surfactants*, 2003, 3(10), 1379-1382.

M. J. O'Connell et al., *Chem. Phys. Lett., Reversible Water-Solubilization of Single-Walled Carbon Nanotubes by Polymer Wrapping*, 2001, 342, 265-271.

J. Jiao et al., Mat. Res. Soc. Symp. Proc., *Fabrication and Characterization of Carbon Nanotube Field Emitters*, 2002, 706, Z5.3.1-Z5.3.6.

S. Li et al., *Chin. Phys. Soc., Electron Field Emission From Single-Walled Carbon Nanotube Nonwoven*, 2006, 15(2), 422-427.

R. F. Wuerker et al., Annales Geophysicae, *Pulsed Energy Storage Antennas For Ionospheric Modification*, 2005, 23, 101-107.

A. Fiori et al., *Dipartimento di Scienze e Technologie Chimiche, Università di Roma Tor Vergata, via delta Ricerca Scientifica*, 00133 Roma; A. Di Carlo et al., *Dipartimento di Ingegneria Elettronica, Università di Roma Tor Vergata, via del Politecnico*, 00133 Roma; A. Ciorba et al., *Dipartimento di Energetica, Università di Roma La Sapienza via Scarpa 16*, 00162 Roma, *Field Emission Properties of Selected Single Wall Carbon Nanotube Samples*.

F. Olsson et al., *BAE Systems Bofors, Experiments and Simulations of a Compact UWB Pulse Generator Coupled to Different Antenna Structures*, SE-691 80 KARLSKOGA, Sweden.

R. Krupke et al., *Science, Separation of Metallic from Semiconducting Single-Walled Carbon Nanotubes*, 2003, 301, 344-347.

Z. Chan et al., *J. Dispersion Sci. and Tech., Influence of AC Electric Field on Dispersion of Carbon Nanotubes in Liquids*, 2006, 27, 935-940.

C. A. Grimes et al., *Chem. Phys. Lett., The 500 MHz to 5.50 GHz Complex Permittivity Spectra of Single-Wall Carbon NAnotube-Loaded Polymer Composites*, 2000, 319, 460-464.

J. Liu et al., *Science, Fullerene Pipes*, 1998, 280, 1253-1256.

M. Zhang et al., *Appl. Phys. Lett., Radio-Frequency Characterization for the Single-Walled Carbon Nanotubes*, 2006, 88, 163109-1-163109-3.

J. Han et al., *Phys. Lett., The Conductivity of Single Walled Nanotube Films in Terahertz Region*, 2003, 310, 457-459.

A. Wadhawan et al., *Appl. Phys. Lett., Nanoparticle-Assisted Microwave Absorption By Single-Wall Carbon Nanotubes*, 2003, 83(13), 2683-2685.

C. Highstrete et al., *Appl. Phys. Lett., Microwave Dissipation in Arrays of Single-Wall Carbon Nanotubes*, 2006, 89, 173105-1-173105-3.

B. Kim et al., *J. Appl. Phys., Electrical Properties of Single-Wall Carbon Nanotube and Epoxy Composites*, 2003, 94(10), 6724-6728.

T. Imholt et al., *Chem. Mater., Nanotubes in Microwave Fields: Light Emission, Intense Heat, Outgassing, and Reconstruction*, 2003, 15, 3969-3970.

J. Vaillancourt et al., *Electronics Lett., High-Speed Thin-Film Transistor on Flexible Substrate Fabricated at Room Temperature*, 2006, 42(23).

T. Kempa et al., *J. Appl. Phys., Dielectric Media Based on Isolated Metallic Nanostructures*, 2005, 98, 034310-1-034310-4.

W. Shi et al., *Can. J. Phys./Rev. Can. Phys., Investigation on Dielectric Properties of the Polyetherketone Nanocomposite with Lead Titanate Ultrafines*, 2001, 79(5), 847-855.

L. Trakhtenberg et al., *J. Non-Crystalline Solids, New Nano-Composite Metal-Polymer Materials: Dielectric Behaviour*, 2002, 305, 190-196.

Z. Dang et al., *Mater. Res. Bulletin, Dielectric Properties and Morphologies of Composites Filled With Whisker and Nanosized Zinc Oxide*, 2003, 38, 499-507.

R. Che et al., *Adv. Mater., Microwave Absorption Enhancement and Complex Permittivity and Permeability of Fe Encapsulated Within Carbon Nanotubes*, 2004, 16(5), 401-405.

L. Valentini et al., *J. Diamond and Related Mater., AC Conductivity of Conjugated Polymer onto Self-Assembled Aligned Carbon Nanotubes*, 2004, 13, 250-255.

P. Pötschke et al., *Polymer, Dielectric Spectroscopy on Melt Processed Polycarbonate-Multiwalled Carbon Nanotube Composites*, 2003, 44, 5023-5030.

P. C. P. Watts et al., *Chem. Phys. Lett., The Complex Permittivity of Multi-Walled Carbon Nanotube-Polystyrene Composite Films in X-band*, 2003, 378, 609-614.

A. N. Lagarkov et al., *Physical Rev., Electromagnetic Properties of Composites Containing Elongated Conducting Inclusions*, 1996, 53(10), 6318-6336.

K. Kempa, *Physical Rev., Dielectric Function of Media Based on Conductive Particles*, 2006, 74, 033411-1-033411-3.

R. M. Hill et al., *J. Phys. C: Solid State Phys., Bebye and Non-Debye Relaxation*, 1985, 18, 3829-3836.

C. Li et al., *Physical Rev., Single-Walled Carbon Nanotubes as Ultrahigh Frequency Nanomechanical Resonators*, 2003, 68, 073405-1-073405-3.

H. Kim et al., *Appl. Phys. Lett., Electrical Conductivity and Electromagnetic Interference Shielding of Multiwalled Carbon Nanotube Composites Containing Fe Catalyst*, 2004, 84(4), 589-591.

J. A. Roberts et al., *J. Appl. Phys., Electromagnetic Wave Properties of Polymer Blends of Single Wall Carbon Nanotubes Using a Resonant Microwave Cavity as a Probe*, 2004, 95(8), 4352-4356.

J. Wu et al., *Appl. Phys. Lett., High Microwave Permittivity of Multiwalled Carbon Nanotube Composites*, 2004, 84(24), 4956-4958.

M. Dragoman et al., *Appl. Phys. Lett., Experimental Determination of Microwave Attenuation and Electrical Permittivity of Double-Walled Carbon Nanotubes*, 2006, 88, 153108-1-153108-3.

J. Kim et al., *Physical Rev., Microwave Response of Individual Multiwall Carbon Nanotubes*, 2004, 70, 153402-1-153402-3.

Z. Zhang et al., *J. Appl. Phys., Alternating Current Dielectrophoresis of Carbon Nanotubes*, 2005, 98, 056103-1-056103-3.

Z. Zhang et al., *Acta Physico-Chimica Sinica, Complex Permittivity and Permeability Spectra of Different Kinds of Carbon Nanotubes*, 2006, 22(03), 296-300.

N. Li et al., *Nano Lett., Electromagnetic Interference (EMI) Shielding of Single-Walled Carbon NAnotube Epoxy Composites*, 2006, 6(6), 1141-1145.

J. Hao et al., *IEEE Transactions on Nanotechnology, Infrared and Optical Properties of Carbon Nanotube Dipole Antennas*, 2006, 5(6), 766-775.

Z. Ye et al., *Physical Rev., Microwave Absorption by an Array of Carbon Nanotubes: A Phenomenological Model*, 2006, 74, 075425-1-075425-5.

C. F. Bohren, *Am. J. Phys., How Can a Particle Absorb More Than the Light Incident On It?*, 1983, 51, 323.

What is claimed is:

1. A method for producing at least one nanotube, said method comprising the steps of:
    placing at least one catalyst particle on a nanotube growth substrate surface;
    modifying said at least one catalyst particle; and
    growing said at least one nanotube,
    wherein said step of modifying said at least one catalyst particle comprises modifying the diameter of said at least one catalyst particle, by chemically treating,
        wherein the chemically treating comprises reducing with a liquid solution.

2. The method of claim 1, wherein said method further comprises the steps of:
    contacting said substrate with a gas mixture in a reaction chamber, wherein hydrogen and a carbon containing species comprise said gas mixture;
    heating said substrate; and
    activating said gas mixture, wherein at least one nanotube is produced at said at least one catalyst particle on said nanotube growth substrate.

3. The method of claim 2, wherein said gas mixture is preheated prior to introduction to said reaction chamber.

4. The method of claim 2, wherein said gas mixture comprises a hydrocarbon.

5. The method of claim 1, wherein said at least one catalyst particle is placed on said substrate by a vapor deposition method.

6. The method of claim 1, wherein said at least one catalyst particle is placed on said substrate in a pattern.

7. The method claim 2, wherein said method further comprises the step of further growing said at least one nanotube by a conventional growth process.

8. The method of claim 2, wherein said at least one nanotube grows at about 2.5 µm per minute.

9. The method of claim 2, wherein said heating step is performed with a filament.

10. The method of claim 1, wherein said at least one nanotube comprises substantially at least one single walled nanotube (SWNT).

11. The method of claim 2, wherein said at least one nanotube is used in a semiconductor device.

12. The method of claim 2, wherein said gas mixture is activated prior to introduction to said reaction chamber.

13. The method of claim 2, wherein said gas mixture and said substrate are heated in said reaction chamber from about room temperature to a temperature sufficient to produce said at least one nanotube.

14. The method of claim 2, wherein a pressure of said reaction chamber is at a sub-atmospheric pressure during at least said step of contacting.

15. The method of claim 2, wherein a temperature to produce said at least one nanotube is dependent upon a pressure.

16. The method of claim 2, wherein a pressure is dependent upon a temperature to produce said at least one nanotube.

17. The method of claim 1, wherein said at least one nanotube comprises at least one vertical nanotube.

18. The method of claim 2, wherein said at least one nanotube comprises at least one vertical nanotube.

19. The method of claim 2, wherein said at least one nanotube comprises at least one small diameter nanotube.

20. The method of claim 1, wherein the liquid solution comprises a halogen acid.

21. A method for producing at least one nanotube, said method comprising the steps of:
    placing at least one catalyst particle on a nanotube growth substrate surface;
    modifying said at least one catalyst particle; and
    growing said at least one nanotube,
    wherein said step of modifying said at least one catalyst particle comprises increasing the diameter of said at least one catalyst particle, by heat treating in a furnace held at 500° C.

22. A method for producing at least one nanotube, said method comprising the steps of:
    placing at least one catalyst particle on a nanotube growth substrate surface;
    modifying said at least one catalyst particle; and
    growing said at least one nanotube,
    wherein said step of modifying said at least one catalyst particle comprises increasing the diameter of said at least one catalyst particle, by ion bombardment treating.

* * * * *